(12) United States Patent
Tanaka et al.

(10) Patent No.: US 10,737,638 B2
(45) Date of Patent: Aug. 11, 2020

(54) VEHICULAR PILLAR STRUCTURE

(71) Applicant: Toyota Jidosha Kabushiki Kaisha, Toyota-shi Aichi-ken (JP)

(72) Inventors: Ken Tanaka, Aichi-ken (JP); Yasuhiro Ito, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 91 days.

(21) Appl. No.: 16/245,869

(22) Filed: Jan. 11, 2019

(65) Prior Publication Data

US 2019/0217790 A1 Jul. 18, 2019

(30) Foreign Application Priority Data

Jan. 16, 2018 (JP) .................... 2018-005006

(51) Int. Cl.
| | |
|---|---|
| *B60R 13/02* | (2006.01) |
| *B62D 25/04* | (2006.01) |
| *B60S 1/58* | (2006.01) |
| *B60S 1/54* | (2006.01) |

(52) U.S. Cl.
CPC .............. *B60R 13/025* (2013.01); *B60S 1/54* (2013.01); *B60S 1/586* (2013.01); *B62D 25/04* (2013.01); *B60R 2013/0287* (2013.01)

(58) Field of Classification Search
CPC .......... B60R 13/025; B60R 2013/0287; B62D 25/04; B60S 1/586; B60S 1/54; B60H 1/34
USPC .................................................... 296/193.06
See application file for complete search history.

(56) References Cited

U.S. PATENT DOCUMENTS

| | | | | |
|---|---|---|---|---|
| 5,941,596 | A | * 8/1999 | See ........................... | B60J 1/02 |
| | | | | 296/193.06 |
| 9,227,673 | B2 * | 1/2016 | Berger ................... | B29C 70/68 |
| 2011/0248525 | A1 * | 10/2011 | Lundstroem .......... | B62D 25/04 |
| | | | | 296/191 |

FOREIGN PATENT DOCUMENTS

| | | |
|---|---|---|
| JP | H04095861 U | 8/1992 |
| JP | 2003341351 A | 12/2003 |
| JP | 2006273057 A | 10/2006 |
| JP | 2014031043 A | 2/2014 |

\* cited by examiner

*Primary Examiner* — Pinel E Romain
(74) *Attorney, Agent, or Firm* — Dinsmore & Shohl LLP

(57) ABSTRACT

A vehicular pillar structure including: a first front pillar garnish, a first pillar being extended substantially along a vehicle vertical direction; a second front pillar garnish and a second pillar being extended substantially along the vehicle vertical direction, a transparent member that is bridged between the first pillar and the second pillar; an extended portion that is provided on the vehicle interior side and on a vehicle upper side of the transparent member, is formed in a plate shape whose plate thickness direction is a substantially vehicle width direction, and is extended from an upper end portion of the second front pillar garnish to an upper end portion of the first front pillar garnish; and an upper lid member provided to cover a space between a lower end portion of the extended portion and the transparent member, and is configured as a separate body from the second front pillar garnish.

5 Claims, 9 Drawing Sheets

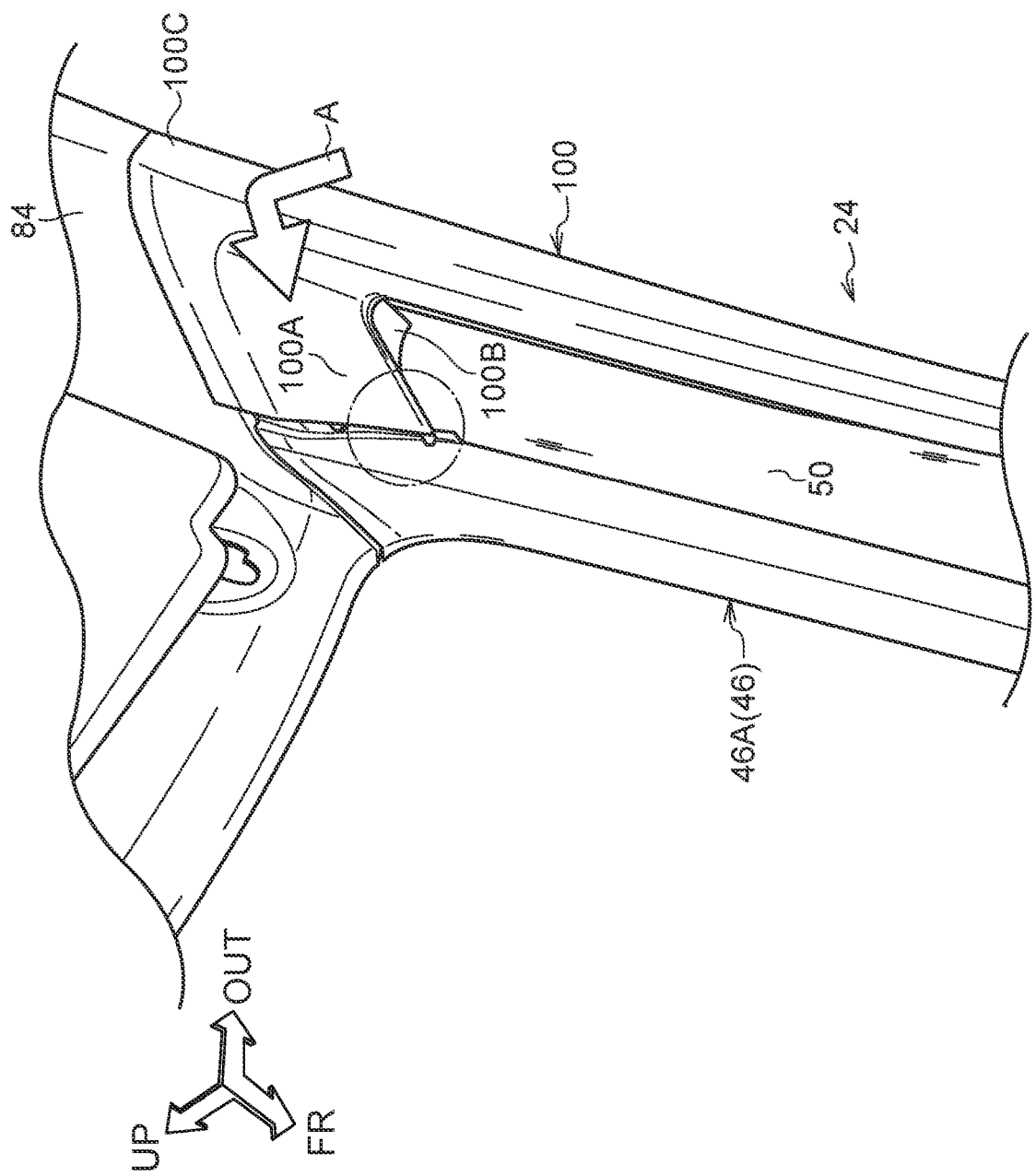

VEHICULAR PILLAR STRUCTURE

CROSS-REFERENCE TO RELATED APPLICATION

This application claims priority under 35 USC 119 from Japanese Patent application No. 2018-005006 filed on Jan. 16, 2018, the disclosure of which is incorporated by reference herein in its entirety.

BACKGROUND

Technical Field

The present disclosure relates to a vehicular pillar structure.

Related Art

Japanese Patent Application Laid-Open (JP-A) No. 2006-273057 has disclosed a vehicular pillar structure. This vehicular pillar structure has a front pillar inner panel and a front pillar frame provided opposite to this front pillar inner panel, and a transparent member is held by the front pillar inner panel and the front pillar frame. An opening penetrating in a plate thickness direction is formed in the front pillar inner panel and the front pillar frame, so that a driver can confirm an object behind a front pillar from this opening through the transparent member.

It is desirable to minimize the amount of protrusion of a front pillar garnish into a vehicle interior in order to improve the visibility, the front pillar garnish being attached to the front pillar as an interior material. Therefore, it is necessary to make the front pillar garnish in a first pillar configuring a vehicle front side of the transparent member in the front pillar and the front pillar garnish in a second pillar configuring a vehicle rear side of the transparent member in the front pillar each have an optimal cross-sectional shape. In this case, considering the moldability, it is desirable that a first front pillar garnish (hereinafter, referred to as a "first garnish") attached to the first pillar and a second front pillar garnish attached to the second pillar (hereinafter, referred to as a "second garnish") are formed as separate bodies from each other. Further, it is desirable that an upper end portion of the first garnish and an upper end portion of the second garnish are coupled to each other in view of appearance design. Therefore, it is conceivable to provide an extended portion that is extended from one of the upper end portion of the first garnish and the upper end portion of the second garnish to the other, and to provide a portion that is folded back from a lower end portion of the extended portion toward the transparent member so as to prevent an inside from being seen from a space between the extended portion and the transparent member. However, when the first garnish and the second garnish are each assembled to the front pillar, particularly, the folded portion of the extended portion interferes with the other members, and thereby, there is a possibility that assembling workability is deteriorated. Therefore, the technique according to JP-A No. 2006-273057 has room for improvement in this respect.

SUMMARY

According to the present disclosure, there is obtained a vehicular pillar structure capable of securing a wide field of view during vehicle driving, and improving assembling workability.

A first aspect of the present disclosure is a vehicular pillar structure including: a first front pillar garnish that configures a part of a front pillar and covers a first pillar from a vehicle interior side, the first pillar being extended substantially along a vehicle vertical direction; a second front pillar garnish that configures another part of the front pillar, and that covers a second pillar from the vehicle interior side, the second pillar being disposed on a vehicle rear side at a predetermined distance from the first pillar, and being extended substantially along the vehicle vertical direction; a transparent member that is bridged between the first pillar and the second pillar, and that makes a vehicle outside visible as viewed from a driver seat side; an extended portion that is provided on the vehicle interior side and on a vehicle upper side of the transparent member, that is formed in a plate shape whose plate thickness direction is substantially a vehicle width direction, and that is extended from an upper end portion of the second front pillar garnish to an upper end portion of the first front pillar garnish; and an upper lid member that is provided so as to cover a space between a lower end portion of the extended portion and the transparent member, and that is configured as a separate body from the second front pillar garnish.

According to the first aspect, the first garnish covering the first pillar, and the second garnish covering the second pillar are provided. The transparent member is bridged between the first pillar and the second pillar, so that when viewed from the driver seat side, the outside of the vehicle is visible from the transparent member. The extended portion is provided on the vehicle interior side and on the vehicle upper side of this transparent member. Since this extended portion is formed in a plate shape whose plate thickness direction is substantially the vehicle width direction, and is extended from the upper end portion of the second garnish to the upper end portion of the first garnish, the upper end portion of the first garnish and the upper end portion of the second garnish have a continuous appearance.

Here, the extended portion is provided with the upper lid member. The upper lid member is provided so as to cover the space between the lower end portion of the extended portion and the transparent member, which can prevent an inside from being seen from the space between the extended portion and the transparent member. The upper lid member is configured as a separate body from the second garnish. Therefore, by attaching the upper lid member after attaching the second garnish to the second pillar, the upper lid member can be restrained from interfering with other members when the first garnish and the second garnish are assembled.

A second aspect of the present disclosure, in the first aspect, is the vehicular pillar structure in which a defroster that blows air substantially toward the vehicle upper side along the transparent member is provided on the vehicle interior side with respect to the transparent member, and the upper lid member is inclined to the vehicle upper side with respect to a direction perpendicular to a plane of the transparent member heading inward in the vehicle width direction.

According to the second aspect, the defroster that blows air substantially toward the vehicle upper side along the transparent member is provided on the vehicle interior side with respect to the transparent member. The upper lid member is inclined to the vehicle upper side with respect to the direction perpendicular to the plane of the transparent member as going inward in the vehicle width direction. Therefore, when the wind blown from the defroster flows substantially toward the vehicle upper side along the transparent member, and abuts on the upper lid member, the wind is guided by the upper lid member and flows inward in the vehicle width direction. That is, since the wind from the defroster is caused to flow smoothly to the vehicle interior side without staying in the vicinity of the upper lid member, much wind can be caused to flow along the transparent member. This can suppress fogging of the transparent member.

A third aspect of the present disclosure is the vehicular pillar structure, wherein the defroster is formed as a member provided between a lower end portion of the first front pillar garnish and a lower end portion of the second front pillar garnish in the second aspect.

According to the third aspect, since the defroster is formed as a member provided between the lower end portion of the first garnish and the lower end portion of the second garnish, the defroster can blow air directly toward the vehicle lower side of the transparent member. Therefore, the fogging of the transparent member can be suppressed by causing the wind to flow over a wide range of from the vehicle lower side of the transparent member to the vehicle upper side thereof.

A fourth aspect of the present disclosure is the vehicular pillar structure, wherein a through hole penetrating substantially in the vehicle vertical direction is formed in the upper lid member in any one of the first to the third aspects.

According to the fourth aspect, the through hole penetrating substantially in the vehicle vertical direction is formed in the upper lid member. Therefore, when the wind blown from the defroster flows along the transparent member substantially toward the vehicle upper side, and abuts on the upper lid member, the wind flows from the through hole of the upper lid member to an inside of a vehicle body. That is, the wind from the defroster flows out from the through hole, whereby the wind does not stay in the vicinity of the upper lid member, so that much wind can flow along the transparent member. This can suppress fogging of the transparent member.

A fifth aspect of the present disclosure is the vehicular pillar structure, wherein the through hole is formed in an elongated hole shape whose longitudinal direction is substantially the vehicle width direction in the fourth aspect.

According to the fifth aspect, the through hole is formed in an elongated hole shape whose longitudinal direction is substantially the vehicle width direction. That is, the through hole is extended in a direction substantially perpendicular to a visual line direction from a driver seat to a vehicle front side. Therefore, the inside can be restrained from being seen from the driver seat through the through hole.

As described above, the vehicular pillar structure according to the first aspect can secure a wide field of view during vehicle driving, and can improve assembling workability.

In the vehicular pillar structure according to the second to fourth aspects, the field of view through the transparent member can be favorably maintained.

The vehicular pillar structure according to the fifth aspect can improve the appearance design.

BRIEF DESCRIPTION OF THE DRAWINGS

Exemplary embodiments of the present disclosure will be described in detail based in the following figures, wherein:

FIG. 9 is a schematic perspective view showing a late state in the assembling process of the second garnish of the vehicular pillar structure according to the comparative example.

DETAILED DESCRIPTION

Hereinafter, one embodiment of a vehicular pillar structure according to the present disclosure will be described with reference to FIGS. 1 to 7. In each of the drawings, arrow FR indicates a front side in a vehicle front-rear direction, arrow OUT indicates an outer side in a vehicle width direction, and arrow UP indicates an upper side in a vehicle vertical direction.

Figure 1:
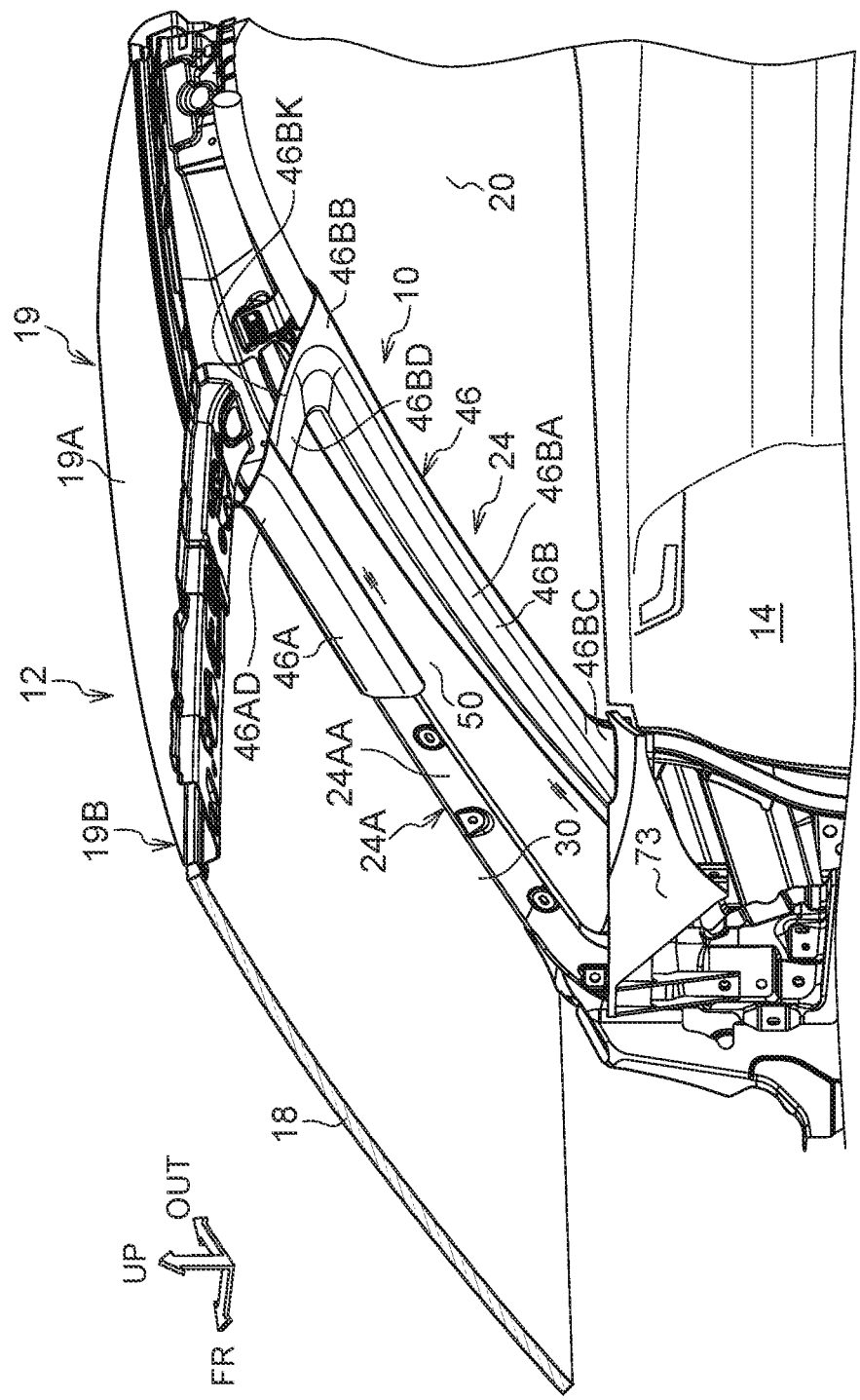
FIG. 1 is a schematic perspective view showing a vehicle interior of a vehicle having a mounting structure of a vehicular pillar structure according to one embodiment in a partial cross section.

As shown in FIG. 1, a pair of right and left vehicular seats (not shown) are disposed on a vehicle front side in a vehicle interior 14 of a vehicle 12 to which a vehicular pillar structure 10 according to the present embodiment is applied, and a driver (not shown) can be seated on one of the vehicular seats. On the vehicle front side with respect to the vehicular seats, a front windshield glass (hereinafter, simply referred to as a "windshield") 18 is provided. This windshield 18 is a transparent window member that separates an inside of the vehicle interior 14 from an outside of the vehicle interior 14, and whose plate thickness direction is substantially the vehicle front-rear direction, and this windshield 18 is inclined to a vehicle rear side as going toward a vehicle upper side in side view. An upper end portion of the windshield 18 is connected to a front header 19B configuring a front end portion of a roof 19 including a roof panel 19A. A lower end portion of the windshield 18 is disposed opposite to, in the vehicle front-rear direction, a rear end portion of a hood covering from the vehicle upper side, a power unit room provided on the vehicle front side, and is connected to a cowl extended in the vehicle width direction (neither is shown).

The windshield 18 is formed with a constant plate thickness and is formed in a gently curved shape such that a middle portion in the vehicle width direction of the windshield 18 is convex toward the vehicle front side. A pair of right and left front pillars 24 are provided on an outer side of the windshield 18 in the vehicle width direction, and on the vehicle front side of front side windows 20, respectively.

The pair of right and left front pillars 24 are extended along end portions 30 of the windshield 18 in the vehicle width direction with substantially the vehicle vertical direction as a longitudinal direction. That is, the pair of right and left front pillars 24 are inclined to the vehicle rear side as going toward the vehicle upper side. Hereinafter, while the front pillar 24 on one side in the vehicle width direction will be described, the front pillar 24 on the opposite side (on the other side in the vehicle width direction) also has the same configuration.

(First Pillar)

Figure 2:
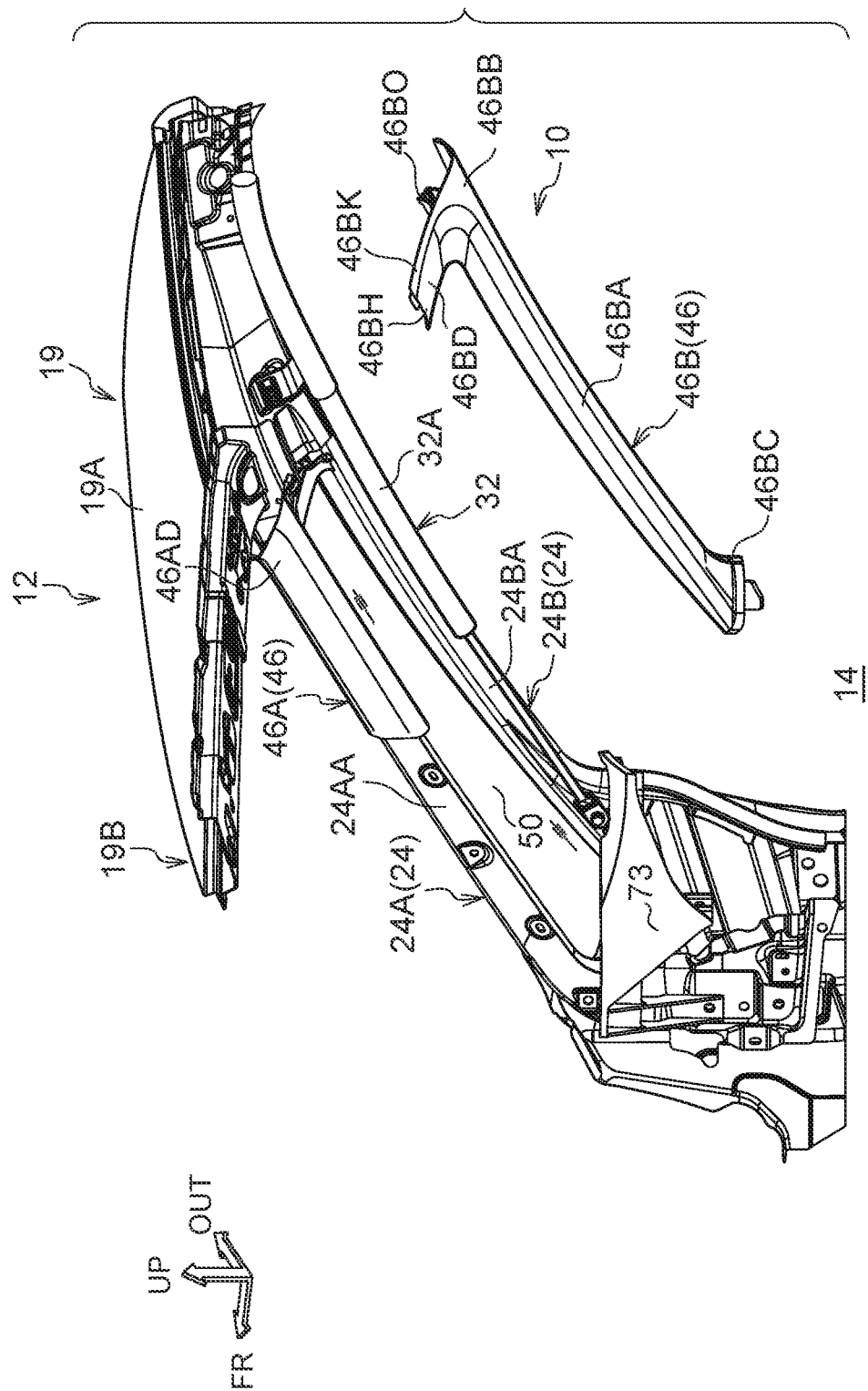
FIG. 2 is a schematic perspective view showing a state in which a second garnish is removed with respect to FIG. 1.

As shown in FIG. 2, the front pillar 24 has a first pillar 24A and a second pillar 24B. The first pillar 24A is extended substantially in the vehicle vertical direction, and the end portion 30 (see FIG. 1) of the windshield 18 in the vehicle width direction is joined to the first pillar 24A through a urethane adhesive and a cushion rubber (neither is shown). The first pillar 24A includes a first pillar inner panel 24AA made of a steel plate and a first pillar outer panel 24AB (see FIG. 7) made of a steel plate. The first pillar outer panel 24AB and the first pillar inner panel 24AA are joined to each other by welding, whereby the first pillar 24A has a closed cross-sectional shape orthogonal to the longitudinal direction (see FIG. 7).

(Second Pillar)

The second pillar 24B is disposed substantially on the vehicle rear side of the first pillar 24A. Specifically, the second pillar 24B is disposed at a predetermined distance from the first pillar 24A substantially in the vehicle front-rear direction. This predetermined distance is set to be equal to or longer than a distance between centers of pupils of the driver seated on the vehicular seat. The "distance between the centers of the pupils" is a distance between the center of the pupil of a right eye (not shown) of the driver and the center of the pupil of a left eye (not shown), and for example, for Japanese adults, it is set to about from 60 to 65 mm. In the present embodiment, as one example, this predetermined distance is set to 65 mm.

Figure 7:
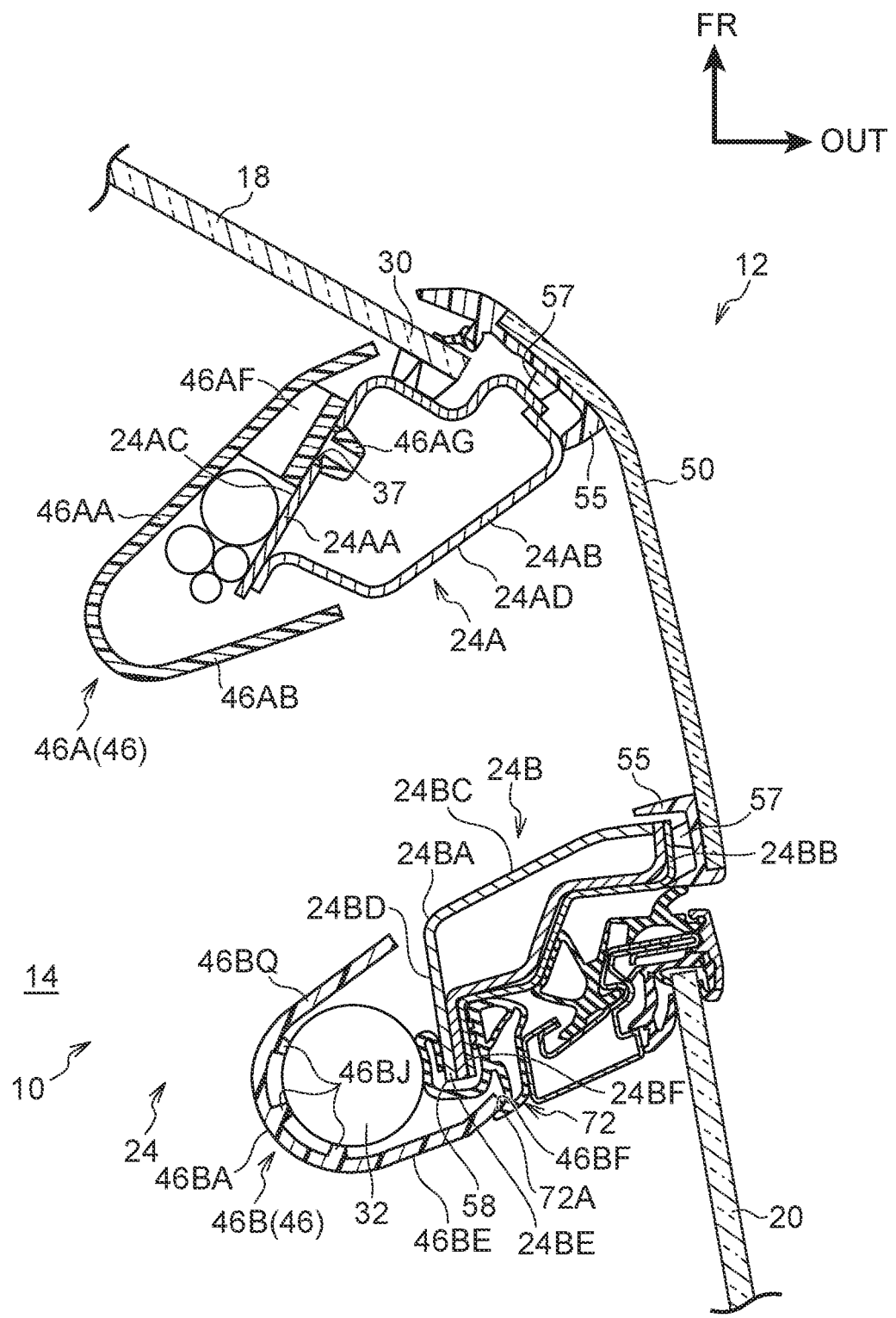
FIG. 7 is an enlarged cross-sectional view showing a state cut along line C-C in FIG. 4.

The second pillar 24B is extended substantially in parallel with the first pillar 24A (substantially along the vehicle vertical direction), and includes a second pillar inner panel 24BA made of a steel plate and a second pillar outer panel 24BB made of a steel plate (see FIG. 7). The second pillar outer panel 24BB and the second pillar inner panel 24BA are provided opposite to each other in the vehicle width direction, and are joined to each other by welding, whereby the second pillar 24B has a closed cross-sectional shape orthogonal to a longitudinal direction (see FIG. 7).

Figure 6:
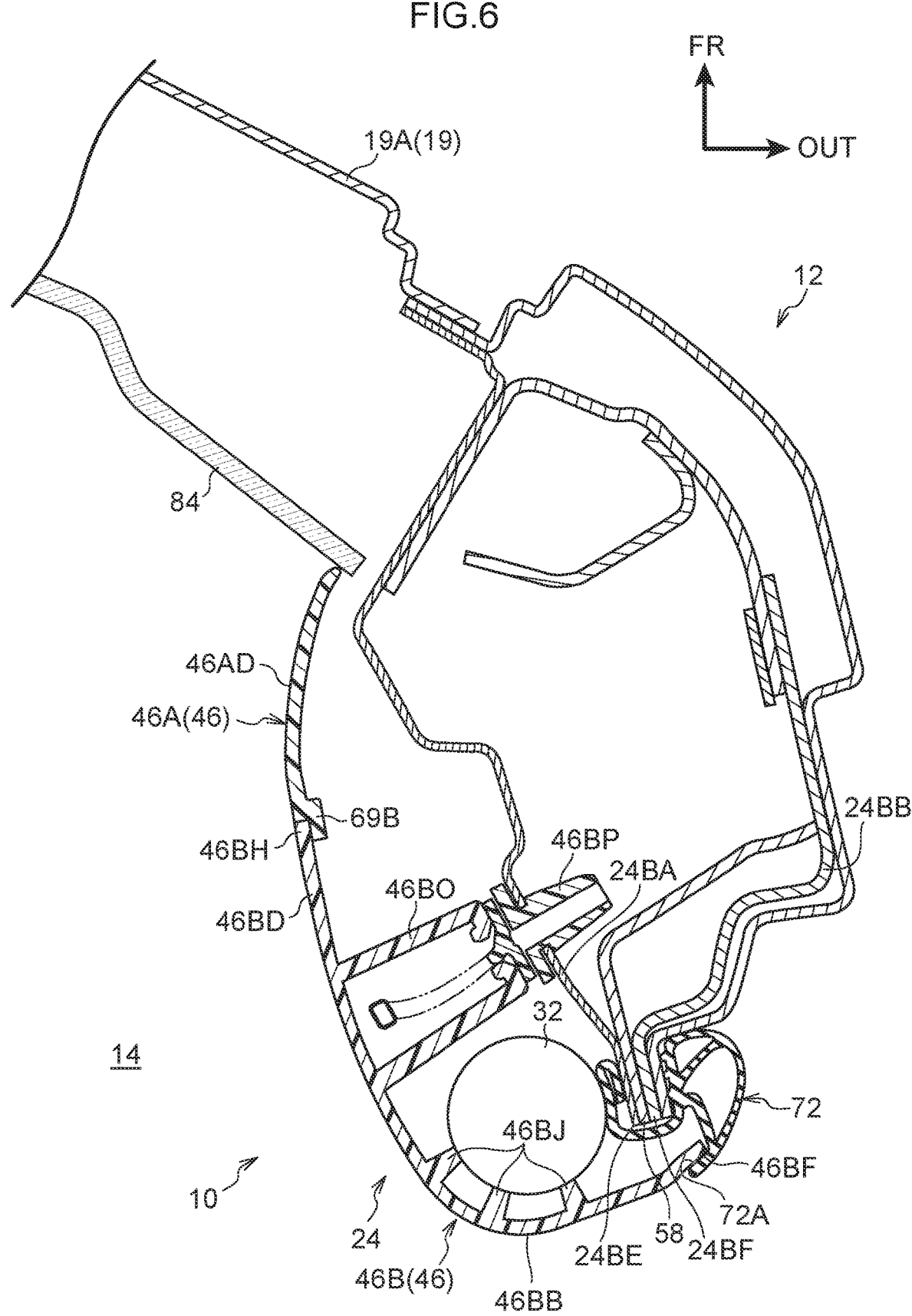
FIG. 6 is an enlarged cross-sectional view showing a state cut along line B-B in FIG. 4.

As shown in FIG. 6, to a portion where an end portion 24BE in a short direction of the second pillar inner panel 24BA and an end portion 24BF in a short direction of the second pillar outer panel 24BB are in contact, that is, to a flange 58, an opening trim 72 is attached. This opening trim 72 is positioned at a position substantially in contact with the second pillar outer panel 24BB.

As shown in FIG. 7, a front pillar outer glass 50 as a transparent member is bridged between the first pillar 24A and the second pillar 24B substantially from the outer side in the vehicle width direction through urethane adhesives 57 and cushion rubbers 55. The front pillar outer glass 50 is a transparent window member whose plate thickness direction is substantially the vehicle width direction, and is inclined to the vehicle rear side as going toward the vehicle upper side in side view. The front pillar outer glass 50 is not limited to glass, but may be made of transparent fiber reinforced resin or the like.

The second pillar 24B is provided with a curtain airbag device 32. This curtain airbag device 32 includes a curtain airbag 32A (see FIG. 2) and an inflator (not shown). The curtain airbag 32A inflates and deploys along a side portion of the vehicle interior by supplying gas from the inflator, and covers a part of the front side window 20 (see FIG. 1) and a B pillar (center pillar, not shown).

(Front Pillar Garnish)

As shown in FIG. 1, a front pillar garnish 46 is provided in an inner side of the first pillar 24A and the second pillar 24B in the vehicle width direction. This front pillar garnish 46 is made of resin and has a first garnish 46A provided on a vehicle interior side of the first pillar 24A, and a second garnish 46B provided on the vehicle interior side of the second pillar 24B (see FIG. 2). In FIGS. 1 and 2, in order to illustrate the first pillar 24A, the illustration of a portion on the vehicle lower side in the first garnish 46A is omitted.

(First Garnish)

The first garnish 46A is extended substantially in the vehicle vertical direction along the first pillar 24A. As shown in FIG. 7, the first garnish 46A includes a first side wall portion 46AA extended substantially in the vehicle width direction and a second side wall portion 46AB opposite to this first side wall portion 46AA, and is formed such that a cross-sectional shape orthogonal to a longitudinal direction has a substantially U shape opening substantially outward in the vehicle width direction. The first side wall portion 46AA is spaced apart from a vehicle front side surface 24AC in the first pillar inner panel 24AA of the first pillar 24A. The second side wall portion 46AB is spaced apart from a vehicle rear side surface 24AD in the first pillar outer panel 24AB of the first pillar 24A, and is disposed on substantially the same plane as the vehicle rear side surface 24AD.

Figure 3:
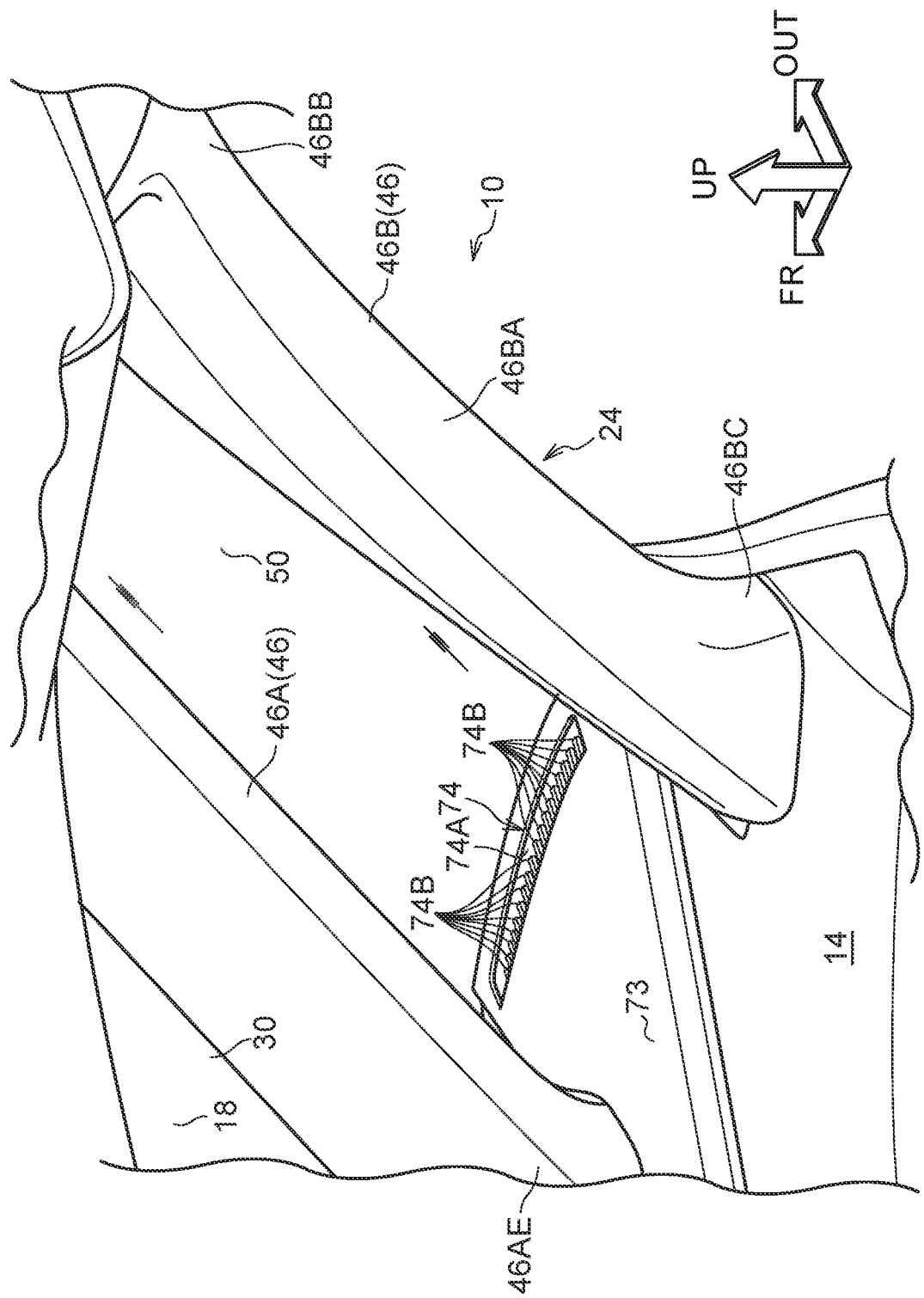
FIG. 3 is a schematic perspective view showing a periphery of a lower end portion of a first garnish and a lower end portion of the second garnish with respect to FIG. 1.

A plurality of clip seats 46AF and clips 46AG attached to these clip seats 46AF are provided on an outer surface (back surface) of the first garnish 46A in the vehicle width direction so as to be spaced apart from one another along a longitudinal direction. These clip seats 46AF are provided opposite to the vehicle front side surface 24AC of the first pillar inner panel 24AA. The clip 46AG attached to each of the clip seats 46AF is inserted into a through hole 37 formed so as to penetrate the vehicle front side surface 24AC in the plate thickness direction, whereby the first garnish 46A is attached to the first pillar 24A. As shown in FIG. 3, a lower end portion 46AE on the vehicle lower side of the first garnish 46A is inserted into an insertion port (not shown) formed in an instrumental panel 73.

(Second Garnish)

The second garnish 46B includes a body portion 46BA extended substantially in the vehicle vertical direction along the second pillar 24B, and an extended portion 46BD provided in an upper end portion 46BB (see FIG. 1) of the body portion 46BA, extended substantially toward the vehicle front side, and formed in a substantially plate shape (see FIG. 1). As shown in FIG. 7, the body portion 46BA includes a first side wall portion 46BQ extended substantially in the vehicle width direction and a second side wall portion 46BE opposite to this first side wall portion 46BQ, and is formed such that a cross-sectional shape orthogonal to a longitudinal direction has a substantially U shape opening substantially outward in the vehicle width direction. The first side wall portion 46BQ is spaced apart from a vehicle front side surface 24BC in the second pillar inner panel 24BA of the second pillar 24B and is extended on substantially the same plane as this vehicle front side surface 24BC. The second side wall portion 46BE is extended to the vehicle rear side of the flange 58 and to an outer side in the vehicle width direction of the flange 58, and an end portion 46BF on the outer side in the vehicle width direction is disposed so as to overlap a lip portion 72A of the opening trim 72 in the vehicle front-rear direction. Further, a plurality of ribs 46BJ protruding outward substantially in the vehicle width direction along the plate thickness direction are formed at a portion between the first side wall portion 46BQ and the second side wall portion 46BE of the second garnish 46B.

In an outer surface (back surface) in the vehicle width direction of the body portion 46BA in a portion where the curtain airbag 32A (see FIG. 2) is not provided, a plurality of clip seats and clips (neither is shown) attached to these clip seats are provided along a longitudinal direction, and spaced apart from one another. These clip seats are provided opposite to an inner side wall portion 24BD substantially in the vehicle width direction of the second pillar inner panel 24BA. The clip attached to each of the clip seats is inserted into a through hole (not shown) in the inner side wall portion 24BD substantially in the vehicle width direction, whereby the second garnish 46B is attached to the second pillar 24B, the through hole being penetrating the plate thickness direction and formed therein (see FIG. 1). As shown in FIG. 1, a lower end portion 46BC of the body portion 46BA on the vehicle lower side is inserted into an insertion port (not shown) formed in the instrumental panel 73.

Figure 4:
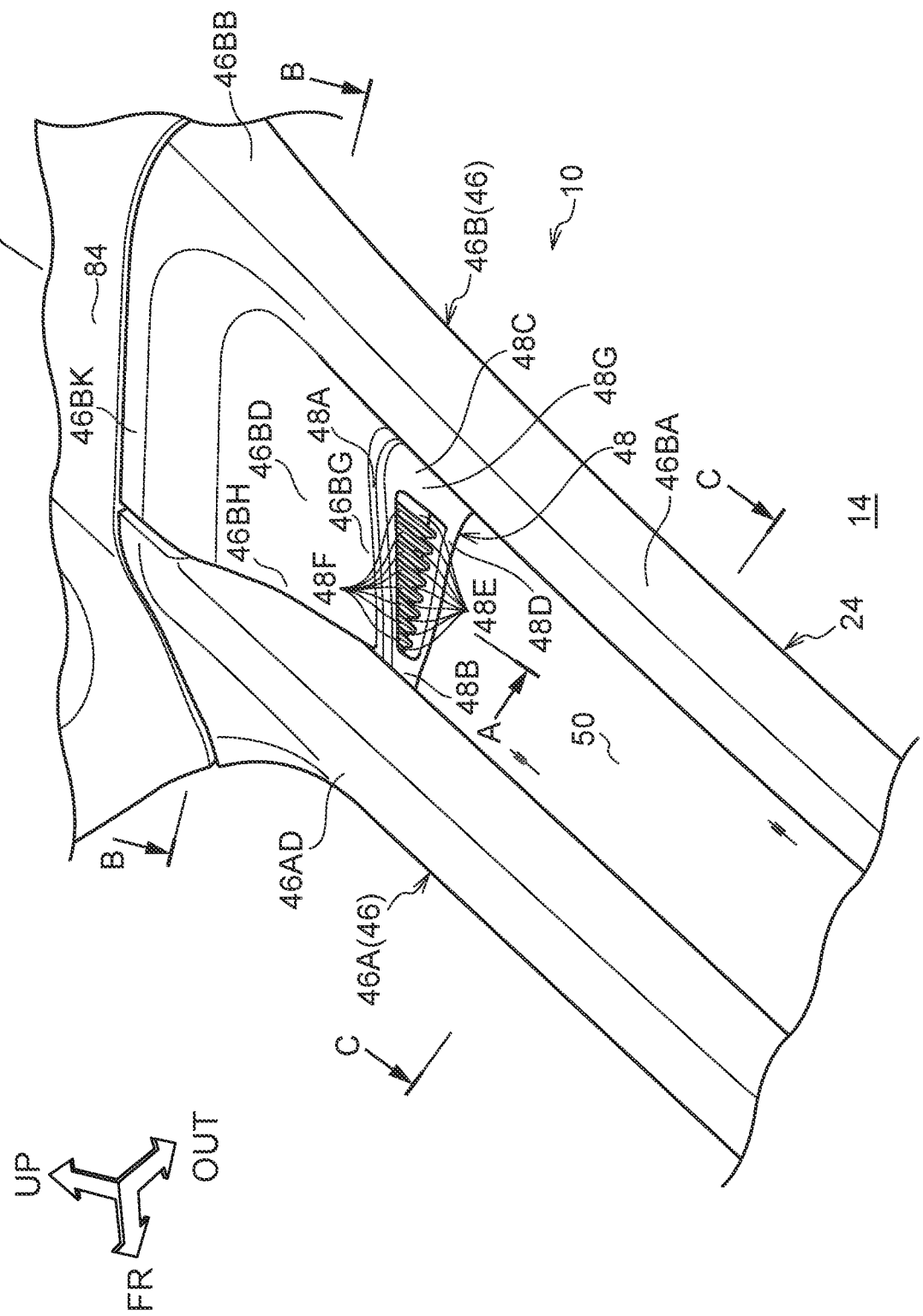
FIG. 4 is a schematic perspective view showing a periphery of an upper end portion of the first garnish and an upper end portion of the second garnish with respect to FIG. 1.

The extended portion 46BD of the second garnish 46B is formed integrally with the body portion 46BA, and as shown in FIG. 4, an upper end portion 46BK of the extended portion 46BD on the vehicle upper side is in contact with a roof head liner 84. A front end portion 46BH of the extended portion 46BD is joined to a stepped portion 69B so as to overlap the same from the inner side in the vehicle width direction, the stepped portion 69B being formed at an upper end portion 46AD of the first garnish 46A and extended substantially outward in the vehicle width direction with respect to a general wall portion of the extended portion 46BD (see FIG. 6). Thereby, an inner surface in the vehicle width direction of the general wall portion of the extended portion 46BD and an inner surface in the vehicle width direction at the upper end portion 46AD of the first garnish 46A are disposed on substantially the same plane.

The extended portion 46BD has a lower end portion 46BG disposed on the inner side in the vehicle width direction with respect to the front pillar outer glass 50, and is formed in a shape curved inward in the vehicle width direction as going from this lower end portion 46BG toward the vehicle upper side. The extended portion 46BD is curved inward in the vehicle width direction as going from the front end portion 46BH of the extended portion 46BD toward the vehicle rear side. As shown in FIG. 6, a clip seat 46BO and a clip 46BP attached to this clip seat 46BO are provided at a position avoiding the curtain airbag device 32 in an outer surface (back surface) of the extended portion 46BD in the vehicle width direction, and the second garnish 46B is also attached to the vehicle body with this clip 46BP.

(Upper Lid Member)

As shown in FIG. 4, an upper lid member 48 is provided between the lower end portion 46BG of the extended portion 46BD and the front pillar outer glass 50. This upper lid member 48 is configured of a plate member whose plate thickness direction is substantially the vehicle vertical direction, and an end portion 48A on the inner side in the vehicle width direction is in contact with the lower end portion 46BG of the extended portion 46BD. A front end portion 48B of the upper lid member 48 is in contact with the upper end portion 46AD of the first garnish 46A, and a rear end portion 48C of the upper lid member 48 is in contact with the upper end portion 46BB of the second garnish 46B. An end portion 48D of the upper lid member 48 on the outer side in the vehicle width direction is spaced apart from the front pillar outer glass 50 at a predetermined distance. This upper lid member 48 is inclined to the vehicle upper side with respect to a direction L perpendicular to a plane of the front pillar outer glass 50 as going inward in the vehicle width direction (see FIG. 5).

Through holes 48E are formed in the upper lid member 48. These through holes 48E are each formed in an elongated hole shape whose longitudinal direction is substantially the vehicle width direction, and the plurality of the through holes 48E are provided side by side substantially in the vehicle front-rear direction. Ribs 48F are each provided between the plurality of adjacent through holes 48E. Each of these ribs 48F is formed in a substantially prismatic shape, and a lower end surface thereof is positioned on the vehicle upper side with respect to a lower end surface 48G of the upper lid member 48.

(Defroster)

As shown in FIG. 3, a defroster 74 is provided in the instrumental panel 73 provided between the first garnish 46A and the second garnish 46B. This defroster 74 has an opening 74A formed in a substantially rectangular shape whose longitudinal direction is substantially the vehicle front-rear direction on the inner side in the vehicle width direction (vehicle interior side) of the front pillar outer glass 50, and this opening 74A is connected to a vehicle air conditioner (neither is shown) through a duct. Therefore, after wind from the vehicle air conditioner abuts on a lower end portion of the front pillar outer glass 50 from the opening 74A, the wind can be blown toward the vehicle upper side along the front pillar outer glass 50. A plurality of air guide plates 74B are provided inside the opening 74A to guide the wind such that the wind blown from the opening 74A flows substantially in parallel with substantially longitudinal directions of the first garnish 46A and the second garnish 46B.

(Actions)

Next, actions of the present embodiment will be described.

Here, using a comparative example shown in FIGS. 8 and 9, the actions and effects of the present embodiment will be described. The same components as those of the present embodiment are denoted by the same reference numerals, and description thereof is omitted.

Figure 8:
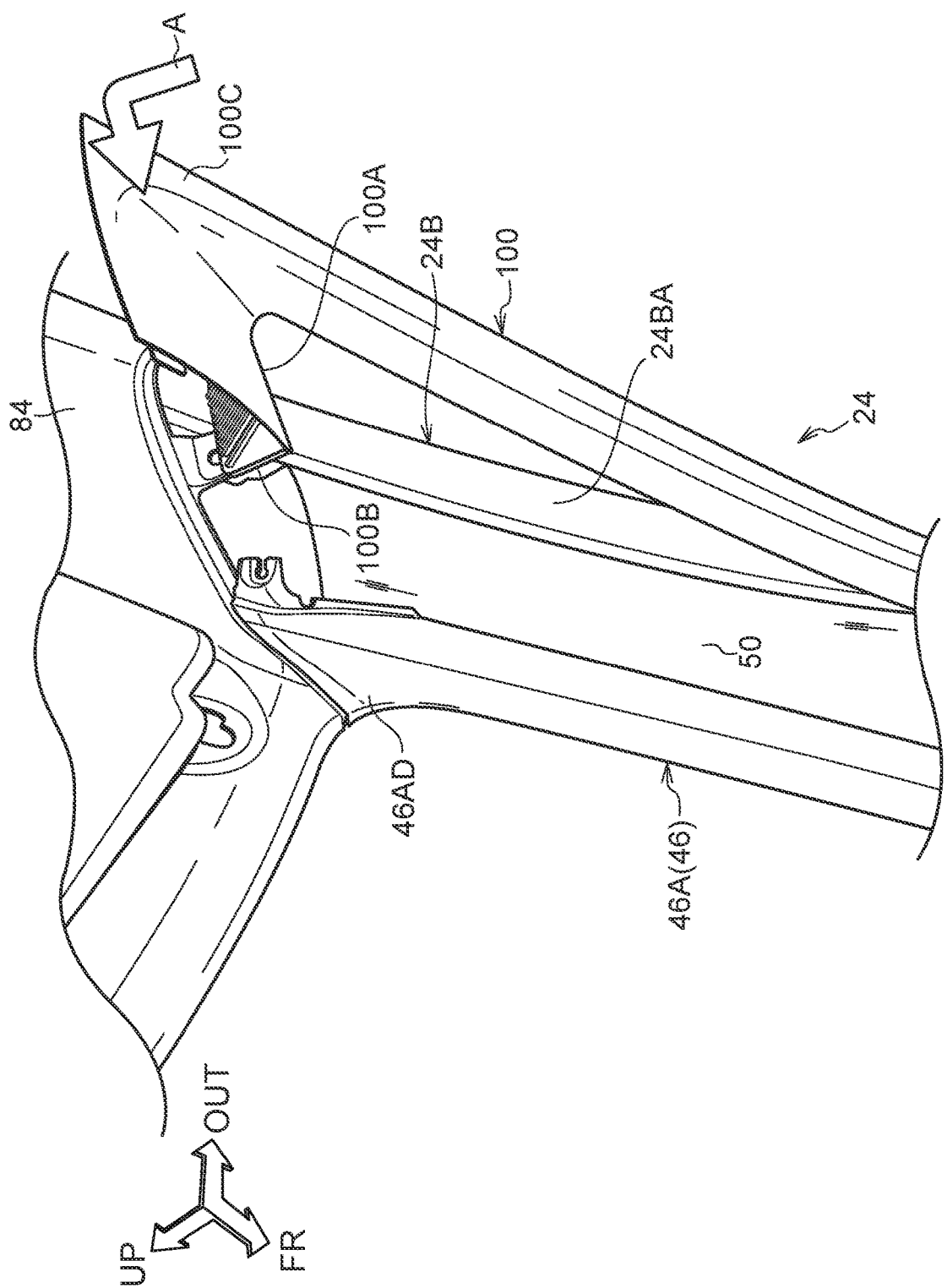
FIG. 8 is a schematic perspective view showing an initial state in an assembling process of a second garnish of a vehicular pillar structure according to a comparative example.

As shown in FIG. 8, in an extended portion 100A provided in a second garnish 100, an upper lid portion 100B folded back from the extended portion 100A to the front pillar outer glass 50 is formed integrally in order to prevent an inside from being seen at the time of attachment to the second pillar 24B. When the second garnish 100 is attached to the second pillar 24B, after a lower end portion (not shown) is inserted into the insertion port (not shown) of the instrumental panel 73, an upper end portion 100C is rotated in a direction of arrow A so that the extended portion 100A comes in contact with the upper end portion 46AD of the first garnish 46A attached to the first pillar 24A in advance. In this case, as shown in FIG. 9, there is a possibility that the upper lid portion 100B of the second garnish 100 interferes with the first garnish 46A, and that the second garnish 100 cannot be assembled.

In the present embodiment, as shown in FIG. 1, the first garnish 46A covering the first pillar 24A and the second garnish 46B covering the second pillar 24B (see FIG. 2) are provided. The front pillar outer glass 50 is bridged between the first pillar 24A and the second pillar 24B, and when viewed from the driver seat side, the outside of the vehicle is visible from this front pillar outer glass 50. The extended portion 46BD is provided on the vehicle interior side and on the vehicle upper side of the front pillar outer glass 50. Since this extended portion 46BD is formed in a plate shape whose plate thickness direction is substantially the vehicle width direction, and which is extended from the upper end portion 46BB of the second garnish 46B to the upper end portion 46AD of the first garnish 46A, the upper end portion 46AD of the first garnish 46A and the upper end portion 46BB of the second garnish 46B have a continuous appearance.

Here, as shown in FIG. 4, the upper lid member 48 is provided on the extended portion 46BD. The upper lid member 48 is provided so as to cover a space between the lower end portion 46BO of the extended portion 46BD and the front pillar outer glass 50, and this can prevent the inside from being seen from the space between the extended portion 46BD and the front pillar outer glass 50. The upper lid member 48 is formed as a separate body from the second garnish 46B. Therefore, attaching the upper lid member 48 after attaching the second garnish 46B to the second pillar 24B can restrain the upper lid member 48 from interfering with other members when the first garnish 46A and the second garnish 46B are assembled. This can ensure a wide field of view during vehicle driving, and improve assembling workability.

Figure 5:
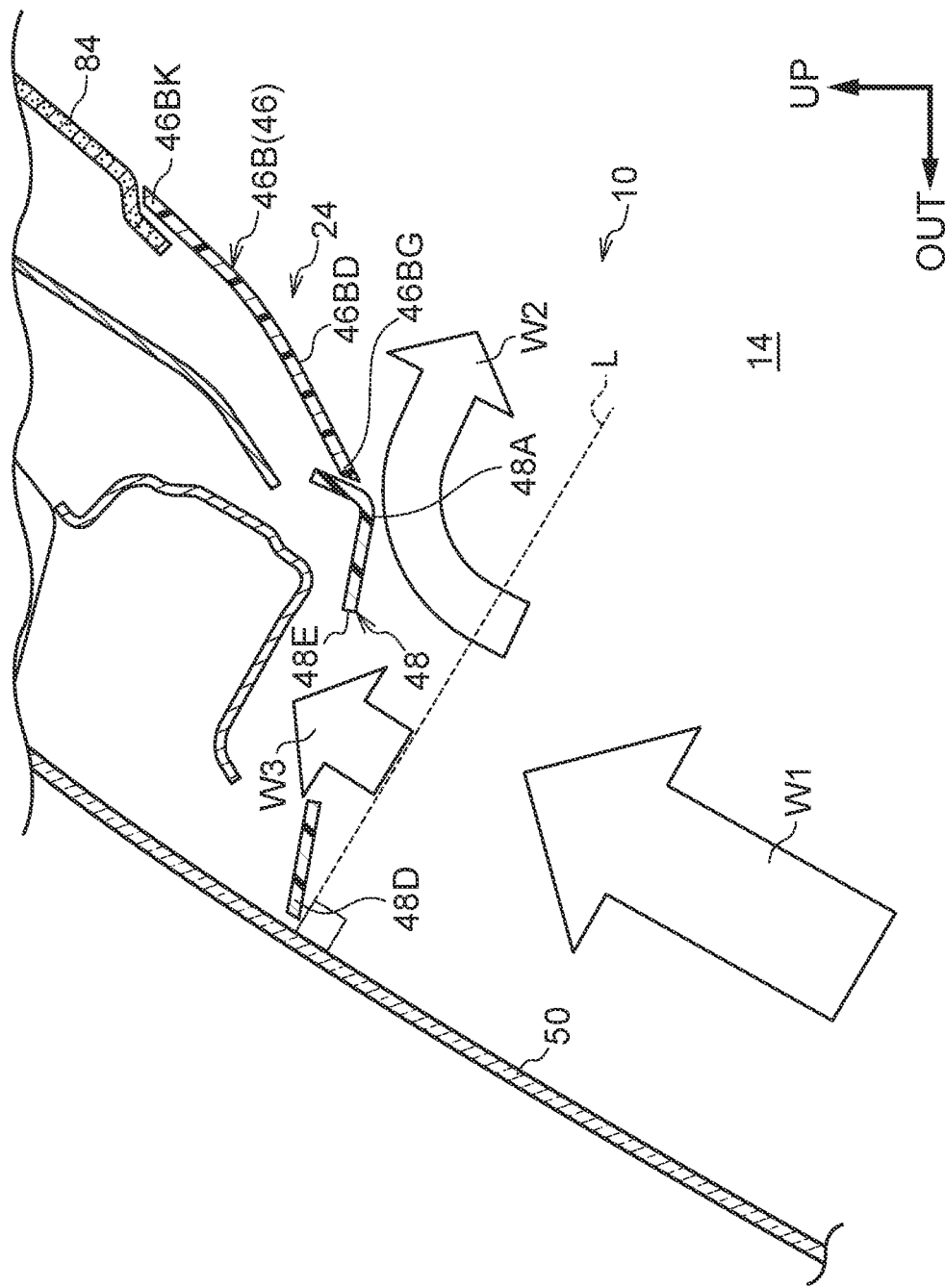
FIG. 5 is an enlarged cross-sectional view showing a state cut along line A-A in FIG. 4.

The defroster 74 that blows air substantially toward the vehicle upper side along the front pillar outer glass 50 is provided on the vehicle interior side with respect to the front pillar outer glass 50 (see FIG. 3). As shown in FIG. 5, the upper lid member 48 is inclined to the vehicle upper side with respect to the direction perpendicular to the plane of the front pillar outer glass 50 as going inward in the vehicle width direction. Therefore, when wind W1 blown from the defroster 74 flows substantially toward the vehicle upper side along the front pillar outer glass 50, and abuts on the upper lid member 48, the wind W1 is guided by the upper lid member 48 and flows inward in the vehicle width direction (see arrow W2 in the figure). That is, since the wind from the defroster 74 flows smoothly to the vehicle interior 14 side without staying in the vicinity of the upper lid member 48, much wind can be made to flow along the front pillar outer glass 50. This can suppress fogging of the front pillar outer glass 50.

Furthermore, since the defroster 74 is formed in the instrumental panel 73 provided between the lower end portion 46AE of the first garnish 46A and the lower end portion 46BC of the second garnish 46B (see FIG. 3), air can be blown directly toward the vehicle lower side of the front pillar outer glass 50. Therefore, the fogging of the front pillar outer glass 50 can be suppressed by causing the wind to flow over a wide range of from the vehicle lower side of the front pillar outer glass 50 to the vehicle upper side thereof.

The through holes 48E penetrating substantially in the vehicle vertical direction are formed in the upper lid member 48. Therefore, when the wind W1 blown from the defroster 74 flows substantially toward the vehicle upper side along the front pillar outer glass 50, and abuts on the upper lid member 48, the wind W1 flows from the through holes 48E of the upper lid member 48 to an inside of a vehicle body (see arrow W3 in the figure). That is, since the wind from the defroster 74 flows out from the through holes 48E, the wind does not stay in the vicinity of the upper lid member 48, so that much wind can flow along the front pillar outer glass 50. This can suppress fogging of the front pillar outer glass 50. The foregoing enables a field of vision through the front pillar outer glass 50 to be maintained favorably.

As shown in FIG. 4, the through holes 48E are each formed in an elongated hole shape whose longitudinal direction is substantially the vehicle width direction. That is, the through holes 48E are extended in a direction substantially perpendicular to a visual line direction from the driver seat to the vehicle front side. Therefore, the inside can be restrained from being seen from the driver seat through the through holes. This can improve the appearance design.

The extended portion 46BD is formed in a shape curved inward in the vehicle width direction as going from the lower end portion 46BG toward the vehicle upper side. The extended portion 46BD is curved inward in the vehicle width direction as going from the front end portion 46BH of the extended portion 46BD toward the vehicle rear side. Therefore, since the wind from the defroster 74 can flow more smoothly to the vehicle interior side, much wind can flow along the front pillar outer glass 50 without staying in the vicinity of the upper lid member 48. Thereby, the fogging of the front pillar outer glass 50 can be further suppressed.

While in the above-described embodiment, the through holes 48E are formed in the upper lid member 48, the present disclosure is not limited thereto, and the through holes 48E need not be formed. While the upper lid member 48 is inclined to the vehicle upper side with respect to the direction L perpendicular to the plane of the front pillar outer glass 50 as going inward in the vehicle width direction, the present disclosure is not limited thereto, but may be extended substantially in the same plane as the direction L perpendicular to the relevant plane, or may be inclined to the vehicle lower side with respect to the direction L perpendicular to the relevant plane. While the through holes 48E formed in the upper lid member 48 are each formed in an elongated hole shape whose longitudinal direction is substantially the vehicle width direction, the present disclosure is not limited thereto, but may be applied to an elongated hole shape whose longitudinal direction is substantially the vehicle front-rear direction, or another shape may be employed.

While the defroster 74 is formed in the instrumental panel 73, the present disclosure is not limited thereto, but a member configuring a part of the front pillar garnish 46 may be provided between the lower end portion 46AE of the first garnish 46A and the lower end portion 46BC of the second garnish 46B, and the defroster 74 may be formed in this member.

While the embodiment of the present disclosure has been described, the present disclosure is not limited to the above description, and, obviously, various modifications other than the forgoing can be made in a range not departing from the gist.

What is claimed is:

1. A vehicular pillar structure comprising:
    a first front pillar garnish that configures a part of a front pillar and covers a first pillar from a vehicle interior side, the first pillar being extended substantially along a vehicle vertical direction;
    a second front pillar garnish that configures another part of the front pillar, and that covers a second pillar from the vehicle interior side, the second pillar being disposed on a vehicle rear side at a predetermined distance from the first pillar, and being extended substantially along the vehicle vertical direction;
    a transparent member that is bridged between the first pillar and the second pillar, and that makes a vehicle outside visible as viewed from a driver seat side;
    an extended portion that is provided on the vehicle interior side and on a vehicle upper side of the transparent member, that is formed in a plate shape whose plate thickness direction is substantially a vehicle width direction, and that is extended from an upper end portion of the second front pillar garnish to an upper end portion of the first front pillar garnish; and an upper lid member that is provided so as to cover a space between a lower end portion of the extended portion and the transparent member, and that is configured as a separate body from the second front pillar garnish.

2. The vehicular pillar structure according to claim 1, wherein a defroster that blows air substantially toward the vehicle upper side along the transparent member is provided on the vehicle interior side with respect to the transparent member, and the upper lid member is inclined to the vehicle upper side with respect to a direction perpendicular to a plane of the transparent member heading inward in the vehicle width direction.

3. The vehicular pillar structure according to claim 2, wherein the defroster is formed as a member provided between a lower end portion of the first front pillar garnish and a lower end portion of the second front pillar garnish.

4. The vehicular pillar structure according to claim 1, wherein a through hole penetrating substantially in the vehicle vertical direction is formed in the upper lid member.

5. The vehicular pillar structure according to claim 4, wherein the through hole is formed in an elongated hole shape whose longitudinal direction is substantially the vehicle width direction.

* * * * *

UNITED STATES PATENT AND TRADEMARK OFFICE
CERTIFICATE OF CORRECTION

PATENT NO. : 10,737,638 B2
APPLICATION NO. : 16/245869
DATED : August 11, 2020
INVENTOR(S) : Ken Tanaka and Yasuhiro Ito It is certified that error appears in the above-identified patent and that said Letters Patent is hereby corrected as shown below:

On the Title Page

Item (72), inventor 1, city, delete "Aichi-ken" and insert --Tougou-cho Aichi-gun Aichi-ken--, therefor.

Item (72), inventor 2, city, delete "Nisshin" and insert --Nisshin-shi Aichi-ken--, therefor.

In the Specification

In Column 9, Line(s) 7, delete "46BO" and insert --46BG--, therefor.

Signed and Sealed this
Fifteenth Day of December, 2020

Andrei Iancu
*Director of the United States Patent and Trademark Office*